(12) United States Patent
Liu

(10) Patent No.: US 9,501,777 B1
(45) Date of Patent: Nov. 22, 2016

(54) SYSTEMS AND METHODS FOR MAC ADDRESS TRACKING FOR A MOBILE DEVICE

(75) Inventor: Hanyang Liu, San Francisco, CA (US)

(73) Assignee: BOINGO WIRELESS, INC., Los Angeles, CA (US)

( * ) Notice: Subject to any disclaimer, the term of this patent is extended or adjusted under 35 U.S.C. 154(b) by 650 days.

(21) Appl. No.: 13/413,553

(22) Filed: Mar. 6, 2012

(51) Int. Cl.
G06Q 30/00 (2012.01)
G06Q 30/02 (2012.01)
H04L 29/06 (2006.01)
H04N 21/426 (2011.01)

(52) U.S. Cl.
CPC .......... *G06Q 30/02* (2013.01); *G06Q 30/0201* (2013.01); *G06Q 30/0251* (2013.01); *G06Q 30/0255* (2013.01); *G06Q 30/0269* (2013.01); *H04L 63/0876* (2013.01); *H04N 21/42684* (2013.01)

(58) Field of Classification Search
None
See application file for complete search history.

(56) References Cited

U.S. PATENT DOCUMENTS

| 2009/0044246 A1* | 2/2009 | Sheehan | H04N 21/2221 725/146 |
| 2009/0187939 A1* | 7/2009 | Lajoie | G06Q 30/02 725/34 |
| 2010/0124937 A1* | 5/2010 | Vogel | G06Q 30/02 455/466 |
| 2010/0250357 A1* | 9/2010 | Kim | G06Q 30/02 705/14.23 |
| 2012/0210011 A1* | 8/2012 | Liu | H04L 63/10 709/229 |
| 2013/0079036 A1* | 3/2013 | Sharet | H04W 4/206 455/456.3 |

OTHER PUBLICATIONS

O'Brien, Kevin J. Google makes sweeping concession on Wi-Fi data collection: At regulators' request, company to allow users to opt-out of registry. International Herald Tribune [Paris] Nov. 16, 2011: 15.*

* cited by examiner

*Primary Examiner* — Timothy Padot
(74) *Attorney, Agent, or Firm* — Lapple Ubell IP Law, LLP; Franklin Ubell

(57) ABSTRACT

Embodiments that include a first module configured to install and work residently within at least a device-to-web bridge to collect the Media Access Control (MAC) address data and secondary identifier information associated with a given mobile computing device are disclosed. An example attempts to use the device-to-web bridge and to pass that information to a second module to call out and send that information over a wide area network to the mobile advertisement targeting system on a central management server site, which stores that information on a MAC address identification (ID) basis in a database. The MAC addresses may be coupled with their secondary identifier and stored within the database. The second module can call and communicate with a mobile advertisement targeting system configured to utilize MAC address data in combination with a secondary identifier for each mobile computing device tracked by the mobile advertisement targeting system.

4 Claims, 5 Drawing Sheets

```
installing and working residently within at least a device-to-web bridge to collect the
MAC address data and secondary identifier information associated with a given mobile
     computing device attempting to use the device-to-web bridge and to pass that
  information to the second module to call out and send that information over a wide
 area network to the mobile advertisement targeting system on a central management
  sever site, which stores that information on a MAC address identification (ID) basis in
     a database; where each MAC address associated is with its own mobile computing
    device and a plurality of such MAC addresses coupled with their secondary identifier
                            are stored within the database
                                         102
```

↓

```
calling and communicating with a mobile advertisement targeting system configured to
  utilize Media Access Control (MAC) address data in combination with a secondary
   identifier for each mobile computing device tracked by the mobile advertisement
                                 targeting system
                                       104
```

↓

```
 gathering intent and demographic data through partnerships with 1) one or more
       device-to-web bridges, 2) one or more native mobile applications on the mobile
    device, 3) one or more web publishers of content on the mobile device, and 4) any
 combination of the three, including where the intent data includes habit data of a user
 of the mobile computing device, and the demographic data includes demographics of
   the user of the mobile computing device, where the second module passes the intent
       and demographic data to an intent and demographic engine of the central
  management sever site that is configured to 1) tie the intent and demographic data
    back to the mobile device's MAC address and secondary identifier, 2) store the
 gathered intent and demographic data, and 3) to then sell advertisement impressions
     targeted based on the stored intent and demographic data collected regarding the
                  user of the mobile computing device stored in the database
                                         106
```

Figure 1

SYSTEMS AND METHODS FOR MAC ADDRESS TRACKING FOR A MOBILE DEVICE

NOTICE OF COPYRIGHT

A portion of the disclosure of this patent document contains material that is subject to copyright protection. The copyright owner has no objection to the facsimile reproduction by anyone of the software engine and its modules, as it appears in the Patent and Trademark Office Patent file or records, but otherwise reserves all copyright rights whatsoever.

FIELD OF THE INVENTION

Embodiments of the invention generally relate to third party authentication of access to both wireless and wired public networks and targeted advertising for devices accessing these networks.

BACKGROUND OF THE INVENTION

Mobile advertising is a form of advertising via wireless telephones or other mobile wireless devices. Such mobile wireless devices have become ubiquitous in many geographic areas and provide an avenue for advertisers to present advertising content to users of such devices. Targeted advertising, whereby advertisements are placed in the hope of reaching specific consumers based on various traits, is generally preferable because these individuals might be more likely to make a purchase than a broader population of consumers.

SUMMARY OF THE INVENTION

Various systems and methods are discussed for mobile advertisement targeting systems. Such systems and methods may include a first module that is configured to install and work residently within at least a device-to-web bridge to collect the Media Access Control (MAC) address data and secondary identifier information associated with a given mobile computing device attempting to use the device-to-web bridge. This information can be passed to a second module to call out and send that information over a wide area network to the mobile advertisement targeting system on a central management server site, which stores that information on a MAC address identification (ID) basis in a database. Each MAC address may be associated with its own mobile computing device and a plurality of such MAC addresses coupled with their secondary identifier are stored within the database.

In an embodiment, the second module is configured to call and communicate with a mobile advertisement targeting system configured to utilize MAC address data in combination with a secondary identifier for each mobile computing device tracked by the mobile advertisement targeting system.

In an embodiment, the first module is configured to gather intent and demographic data through partnerships with 1) one or more device-to-web bridges, 2) one or more native mobile applications on the mobile device, 3) one or more web publishers of content on the mobile device, and 4) any combination of the three. The intent data may includes habit data of a user of the mobile computing device. The demographic data may include demographics of the user of the mobile computing device. The second module can pass the intent and demographic data to an intent and demographic engine of the central management server site. This server site may be configured to 1) tie the intent and demographic data back to the mobile device's MAC address and secondary identifier, 2) store the gathered intent and demographic data, and 3) to then sell advertisement impressions targeted based on the stored intent and demographic data collected regarding the user of the mobile computing device stored in the database.

Modules and engines can be implemented in logic blocks of electronic hardware, software coding, and any combination of the two, where portions implemented in software coding are stored in an executable format by a processor on a non-transitory machine-readable medium. All or just a portion of the software making up, for example, the first and second modules is configured to be 1) compilable into, 2) pluggable to cooperate with, and 3) any combination of the two, software coding of a mobile native application, a mobile browser, software portion of the device-to-web bridge, software portion of a web publisher application, and any combination.

BRIEF DESCRIPTION OF THE DRAWINGS

The drawings refer to embodiments of the invention in which:

FIG. 1 illustrates an example flow of an example for a mobile advertisement targeting system with multiple modules in accordance with the systems and methods described herein.

Figure 2:
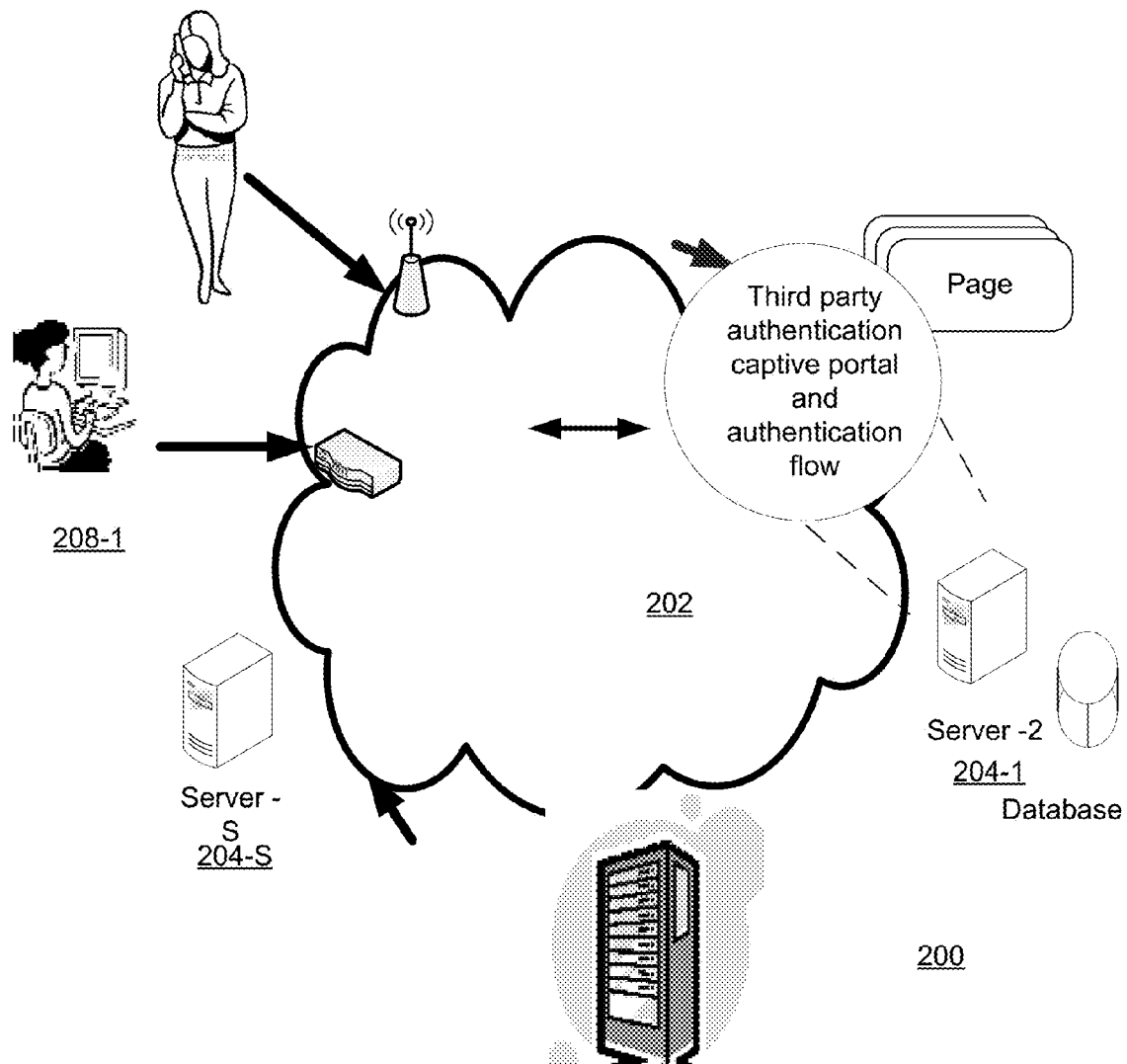
FIG. 2 illustrates a network environment including a database storing pairs of MAC addresses coupled with their secondary identifier for each mobile computing device within the database.

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DISCUSSION

In the following description, numerous specific details are set forth, such as examples of specific data signals, named components, number of web pages, etc., in order to provide a thorough understanding of the present invention. It will be apparent, however, to one of ordinary skill in the art that the present invention may be practiced without these specific details. In other instances, well known components or methods have not been described in detail but rather in a block diagram in order to avoid unnecessarily obscuring the present invention. Further specific numeric references such as first server, may be made. However, the specific numeric reference should not be interpreted as a literal sequential order but rather interpreted that the first server is different than a second server. Thus, the specific details set forth are merely exemplary. The specific details may be varied from and still be contemplated to be within the spirit and scope of the present invention.

In general, a methods, apparatus, and systems described herein relate to mobile advertisement targeting systems. One example is a server based system that can include a central server servicing multiple instances of a program to gather intent and demographic data on a mobile computing device, where each instance is resident on its own mobile computing device. On the central server a first instance of a software module can be stored on a non-transient computer readable medium. The first instance may be configured to install and work residently within at least a device-to-web bridge to collect the MAC address data associated with a given mobile computing device.

A MAC address can be a 48-bit unique identifier assigned to network interfaces for communications on the physical network segment. For example, a typical smart phone will have two MAC addresses; one for its cellular network and one for WiFi. MAC addresses are usually assigned by the manufacturer of a network interface card. As they are used on the Link Layer as opposed to the Internet Layer of TCP/IP, MAC addresses are generally not available to web servers except for a few exceptions.

In an embodiment, the first instance may also be configured to install and work residently within at least a device-to-web bridge to also collect secondary identifier information associated with a given mobile computing device in addition to the MAC address data when the mobile computing device is attempting to use the device-to-web bridge and to pass that information to the second module to call out and send that information over a wide area network to the mobile advertisement targeting system on a central management server site. The site can store that information on a MAC address identification (ID) basis in a database. In the data base each MAC address may be associated is with its own mobile computing device and a plurality of such MAC addresses coupled with their secondary identifier may be stored within the database.

The first module can be configured to gather intent and demographic data through partnerships with 1) one or more device-to-web bridges, 2) one or more native mobile applications on the mobile device, 3) one or more web publishers of content on the mobile device, and 4) any combination of the three. The intent data can include habit data of a user of the mobile computing device and the demographic data can include demographics of the user of the mobile computing device.

In an example embodiment an example apparatus gets at least some of the intent data and conversion tracking data from a physical location such as a brick and mortar store by sniffing a MAC address out of the air. For example, a phone may broadcast its MAC address in a physical location that has a WiFi Internet service. The WiFi router can receive the broadcast MAC address. Accordingly, that MAC address can be associated in a targeting database. Further, as the geographic location might be associated with specific goods or services, shopping habits of a user associated with a device having the received MAC address may be inferred.

An example apparatus may target a user based on the intent data. For example, a user shopping at a geographic location providing various goods and services might be likely to shop at that location again or to buy similar goods and services in the future. Accordingly, the user might be targeted based on this. Additionally, in some example embodiments intent data or some portion of the intent data may be gathered from the Internet.

In an embodiment, the second module passes the intent and demographic data to an intent and demographic engine of the central management server site that is configured to 1) tie the intent and demographic data back to the mobile device's MAC address and secondary identifier, 2) store the gathered intent and demographic data, and 3) to then sell advertisement impressions targeted based on the stored intent and demographic data collected regarding the user of the mobile computing device stored in the database.

In an embodiment, the first module is configured to also install and work with both a mobile browser and a mobile native application. It can also be configured to target 1) mobile web surfing behavior inside of the native application environment, 2) mobile native application usage behavior itself on the mobile web. Example systems may store a device-specific ID within a cookie exposing the MAC address to an internet layer of a communication protocol for advertisement retargeting purposes. A software portion of the first and second modules can be configured to be 1) compilable into, 2) pluggable to cooperate with, and 3) any combination of the two, software coding of the mobile native application, mobile browser, and software portion of the device-to-web bridge.

Any modules and engines might be implemented in logic blocks of electronic hardware, software coding, and any combination of the two. Additionally, portions implemented in software coding are stored in an executable format by a processor on a non-transitory machine-readable medium. A software portion of the first and second modules may be configured to be 1) compilable into, 2) pluggable to cooperate with, and 3) any combination of the two. Additionally, software coding of a mobile native application, a mobile browser, software portion of the device-to-web bridge, software portion of a web publisher application, and any combination might be used.

A second module may be configured to call and communicate with a mobile advertisement targeting system configured to utilize MAC address data in combination with a secondary identifier for each mobile computing device tracked by the mobile advertisement targeting system.

An embodiment covers a way to ID a user using MAC addresses collected from "device-to-web bridges" for the purposes of advertisement targeting and audience segmentation. Device-to-Web bridges are systems that can both collect a client's MAC Address and direct users to a web page. One example is a WiFi captive portal, which is a system that can access the user's MAC Address and pass the MAC address to a web page for manipulation in the internet layer.

One embodiment may use a captive portal or other "bridge" to 1) collect the user's MAC address and 2) set cookies based on that MAC Address. As an alternative to cookies, the MAC address can be paired with the device's "fingerprint" in a database. More generally, the MAC address may be paired with a secondary identifier that can be derived from the user's browser. Both the secondary identifier and the user's MAC address can then be used for the purposes of data collection and advertisement targeting.

By using a subset of the MAC Address as just one component in a larger device fingerprinting scheme, we can improve uniqueness while making the targeting resource more difficult to exploit. An attacker would need to know not only the victim's MAC address but also as many of the other fingerprinting signals as possible to retrieve a profile. By hashing using a slow hashing algorithm like bcrypt, we can make the use of rainbow tables infeasible.

FIG. 1 illustrates an example flow of an example for a mobile advertisement targeting system with multiple modules in accordance with the systems and methods described herein. In step 102 the example method installs and works residently within at least a device-to-web bridge to collect the MAC address data and secondary identifier information associated with a given mobile computing device attempting to use the device-to-web bridge, including mobile cookies if present, and passes that information to a second module to call out and send that information over a wide area network to a mobile advertisement targeting system on a central management server site. In one embodiment, this may occur within a first module.

The central management site stores the information on a MAC address identification (ID) basis in a database, such that each MAC address is associated with its own mobile computing device and a plurality of such MAC addresses coupled with their secondary identifier are stored within the database. In an embodiment, a MAC address engine of the central management server site is configured to use, track, and store the MAC address coupled with its secondary identifier for the purposes of data collection and advertisement targeting. The MAC address engine may also store this information in the database, wherein the stored information is organized and indexed by the MAC address of the mobile computing device.

In an embodiment the database stores, organizes and relates into categories cookies and behaviors of the user of the mobile device. This may be done from a web browser application resident on the mobile computing device and from all of the native mobile applications resident on the mobile device that have the partnership formed with the intent and demographic engine.

The central management server may include an intent and demographic engine that is further configured to gather intent and demographic data through partnerships with 1) two or more device-to-web bridges, 2) native mobile applications on the mobile device, 3) publishers of content on the mobile device, and 4) any combination of the three. The intent data can include habit data of a user of the mobile computing device and the demographic data can include demographics of the user of the mobile computing device. Additionally, the intent and demographic engine may be further configured to 1) tie the intent and demographic data back to the mobile device's MAC address and secondary identifier, 2) store the gathered intent and demographic data, and 3) to then sell advertisement impressions targeted based on the stored intent and demographic data collected regarding the user of the mobile computing device stored in the database.

In some embodiments, the device-to-web bridge is a captive WiFi portal that the user of the mobile computing device must log into in order to access a WiFi network. A secondary identifier can be a Hypertext Transfer Protocol (HTTP) mobile cookie. Additionally, the captive web portal may collect the MAC address and HTTP mobile cookie on a terms and conditions page of the captive WiFi portal.

In an example embodiment, a first module for the device-to-web bridges is additionally configured to collect the MAC address of the mobile computing device and then set cookies based on that MAC Address. In another embodiment a plurality of MAC addresses may be coupled with its secondary identifier stored within the database are stored in a way that can protect user privacy. For example, by collecting a subset of an amount of octets making up a given MAC address. To reduce any privacy concerns, the MAC address may be transformed prior to being stored or used external to the mobile advertisement targeting system such that, rather than using the whole MAC address.

For example, as MAC addresses are transmitted in plain text on WiFi networks and are also trivially easy to obtain in native applications, we want to prevent the risk of an attacker stealing identity information with the MAC address alone. To reduce the risk of privacy concerns, the MAC address can be transformed prior to being stored or used. Rather than using the whole MAC address, a subset of its six octets can be used instead. Furthermore, it can be hashed using a slow hashing algorithm and a salt. Using a salt adds a secret numeric number or sequence to the MAC address, which makes deciphering the MAC address difficult.

By using a subset of the MAC Address as just one component in a larger device fingerprinting scheme, the systems and methods described herein may improve uniqueness while making the targeting resource more difficult to exploit. An attacker would need to know not only the victim's MAC address but also as many of the other fingerprinting signals as possible to retrieve a profile. For example, a hashing using a slow hashing algorithm like bcrypt can make the use of rainbow tables infeasible.

In step 104, calling and communicating with a mobile advertisement targeting system configured to utilize Media Access Control (MAC) address data in combination with a secondary identifier such as a mobile cookie or other device fingerprinting technologies (a secondary identifier than can be derived from a user's browser devices plug ins installed, clock skew, web browser version, internet protocol (IP) address, etc.) for each mobile computing device tracked by the mobile advertisement targeting system. In one embodiment, this may occur within the second module.

In step 106, the example method gathers intent and demographic data through partnerships with 1) one or more device-to-web bridges, 2) one or more native mobile applications on the mobile device, 3) one or more web publishers of content on the mobile device, including TWITTER, FACEBOOK, etc., and 4) any combination of the three. The intent data may include habit data of a user of the mobile computing device and the demographic data may include demographics of the user of the mobile computing device. In one embodiment, this may occur in the first module.

In step 108, the example method passes the intent and demographic data to an intent and demographic engine of the central management server site that is configured to 1) tie the intent and demographic data back to the mobile device's MAC address and secondary identifier, 2) store the gathered intent and demographic data, and 3) to then sell advertisement impressions targeted based on the stored intent and demographic data collected regarding the user of the mobile computing device stored in the database. In one embodiment, this may occur in the second module.

Any modules and engines are implemented in logic blocks of electronic hardware, software coding, and any combination of the two, where portions implemented in software coding are stored in an executable format by a processor on a non-transitory machine-readable medium, where a software portion of the first and second modules is configured to be 1) compilable into, 2) pluggable to cooperate with, and 3) any combination of the two, software coding of a mobile native application, a mobile browser, software portion of the device-to-web bridge, software portion of a web publisher application, and any combination.

Some embodiments of the systems and methods described herein may include a third module specifically configured to embed in and work with a native mobile application to redirect and collect MAC address information and secondary identifier information including mobile cookies when present and then call out and send that information to the central management server site. The central management server may store the MAC address information and secondary identifier information on a MAC address ID basis in the database.

The systems and methods described herein may be utilized in a mobile advertisement targeting product. The business model can be similar to that of online data exchange with mobile cookies, MAC Addresses and other device fingerprinting technologies. This is necessary as conservative 3rd party cookie policies and application sandboxing reduce the effectiveness of standard data collection techniques.

Mobile advertisement exchanges may soon start to incorporate device fingerprinting signals in their bidding systems, enabling rich audience targeting in ways that were never possible before in the mobile advertisement space. MAC address may be a vital component of the fingerprinting mix. The systems and methods described herein can gather intent and demographic data through partnerships, tie it back to the device fingerprint, and to then sell advertisement impressions targeted based on segments we create based on our audience pool.

FIG. 2 illustrates a network environment including a database storing pairs of MAC addresses coupled with their secondary identifier for each mobile computing device within the database. The network environment 200 has a network 202 that connects S number of servers 204-1 through 204-S, and C number of clients 208-1 through 208-C. More details are discussed later below.

Overall, when installed, the module will generally perform an instantaneous redirect away from a default Terms and Condition (T & C) page of the public Wi-Fi and/or wired network over to the third-party captive portal and authentication flow process hosted on the third party server, in effect replacing the original default flow for users of client devices that have their browser's JavaScript enabled. In addition to de facto replacing public WiFi and/or wired network current T&C page flow (a.k.a. the host device's home portal page), the JavaScript snippet will also handle the authentication action to gain entry to the network when the user has completed the third-party captive portal and authentication flow process. The web browser of the client device can be redirected, such as through a HTTP 302 Redirect code, by the JavaScript snippet, embedded with captive host portal software, one or more times until the web browser of the client device reaches the URL of the third party hosted "splash page" and the other web pages served by the third party server.

The module may be implemented in client-side JavaScript to integrate with the T & C page and be parsed by the web browser of the client device when the T & C page is fetched; and thereby, work with diverse types of public Wi-Fi and/or wired network host gateway and host controller equipment, each with their own different configuration but each configuration commonly supports a captive portal with an editable Terms and Condition page and a walled garden policy to give the ability to white list a third party Guest server and its served web pages by 1) IP address 2) name or 3) combination of both. The embeddable portion of the module is scripted to plug in and be integrated into the editable Terms and Condition page of the public Wi-Fi and/or wired network.

The gateway or other form of controller is scripted to implement the captive portal technique to force each HTTP client access the network to see its default T&C page for the authentication flow before using the Internet normally. The gateway or other form of controller is scripted with the embedded portion of the module resident to be redirected to see the third party web pages for the authentication flow before using the Internet normally. When the gateway or other form of controller is going to fetch its T& C webpage, then the embedded portion of the module is part of that T & C webpage that is fetched.

An example embodiment includes an application programming interface configured to establish communications with one or more mobile advertisement exchanges. The advertisement impressions that are targeted to the intent and demographic data collected regarding the user of the mobile device may be sent to the mobile advertisement exchanges, which incorporate this information into their bidding systems.

Referring to FIG. 2, a network environment 200 in which the techniques described may be applied is illustrated. The network environment 200 has a network 202 that connects S servers 204-1 through 204-S, and at least one or more clients 208-1. As shown, the S amount of servers 204-1 through 204-S and C amount of clients 208-1 are connected to each other via a network 202, which may be, for example, the Internet. Note, that alternatively the network 202 might be or include one or more of: an optical network, the Internet, a Local Area Network (LAN), Wide Area Network (WAN), satellite link, fiber network, cable network, or a combination of these and/or others. It is to be further appreciated that the use of the term client and server is for clarity in specifying who initiates a communication (the client) and who responds (the server). No hierarchy is implied unless explicitly stated. Both functions may be in a single communicating device, in which case the client-server and server-client relationship may be viewed as peer-to-peer. Thus, if two devices such as 208-1 and 204-S can both initiate and respond to communications, their communication may be viewed as peer-to-peer. Likewise, communications between 204-1 and 204-S, and 208-1 and 208-C may be viewed as peer to peer if each such communicating device is capable of initiation and response to communication.

The mobile computing device, such as a lap top, smart phone, notebook, or other similar computing device with WiFi functionality built into the device and the device is primarily powered by a DC battery source, may operate in this networked environment using logical connections to one or more remote computers, servers, routers, etc. A browser application may be resident on the computing device and stored in the memory.

When used in a LAN networking environment, the mobile computing device is connected to the LAN through a network interface or adapter. When used in a WAN networking environment, the mobile computing device typically includes a modem, Wi-Fi circuit, or other means for establishing communications over the WAN, such as the Internet. The modem, which may be internal or external, may be connected to the system bus via the user-input interface, or other appropriate mechanism.

In the systems and methods described herein, a wireless communication module may employ a Wireless Application Protocol to establish a wireless communication channel. The wireless communication module may implement a wireless networking standard such as Institute of Electrical and Electronics Engineers (IEEE) 802.11 standard, IEEE std. 802.11-1999, published by IEEE in 1999.

FIG. 2 also illustrates a block diagram of an embodiment of a server to display information, such as a web page, etc. The application, such as the ISIS, when executed on a server 204, causes the server 204 to display windows and user interface screens on a portion of a media space, such as a web page. A user via a browser from a client machine 208 may interact with the page, and then supply input to the query/fields and/or service presented by a user interface of the application. The web page may be served by a web server 204 on any HTML or WAP enabled client device 208 or any equivalent thereof such as a mobile device or personal computer. The client device 208 may host a browser to interact with the server.

When the web browser fetches a file (a page, a picture, etc) from a web server, the web browser issues a Hypertext Transfer Protocol HTTP request for some file (e.g. "Get me the file 'home.html'"), and the web server sends back a response ("Here's the file", followed by the file itself). The request method is usually either "GET" or "POST". Basically if you fill in and submit a form on a web page it might generate a POST request (or it might be "GET"), whereas if you just click on a link, or activate one of your browser's "bookmarks" or "favorites", then the request method will always be "GET". Every time a web server provides you with a response (a page, a graphic, etc), it has the opportunity to send your browser a "cookie". These cookies are small pieces of information which your browser stores, and then sends back to that same web server whenever you subsequently request a document.

Each application, widget, Snippet, Plug in, etc. has a code scripted to perform the functions that the software component is coded to carry out such as presenting fields and icons to take details of desired information. The applications may be hosted on the server and served to the browser of the client machine 208 of the customer. The applications then serve pages that allow entry of details and further pages that allow entry of more details. Any application and other scripted code components may be stored on a computing machine readable medium which, when executed on the server causes the server to perform those functions.

Figure 3:
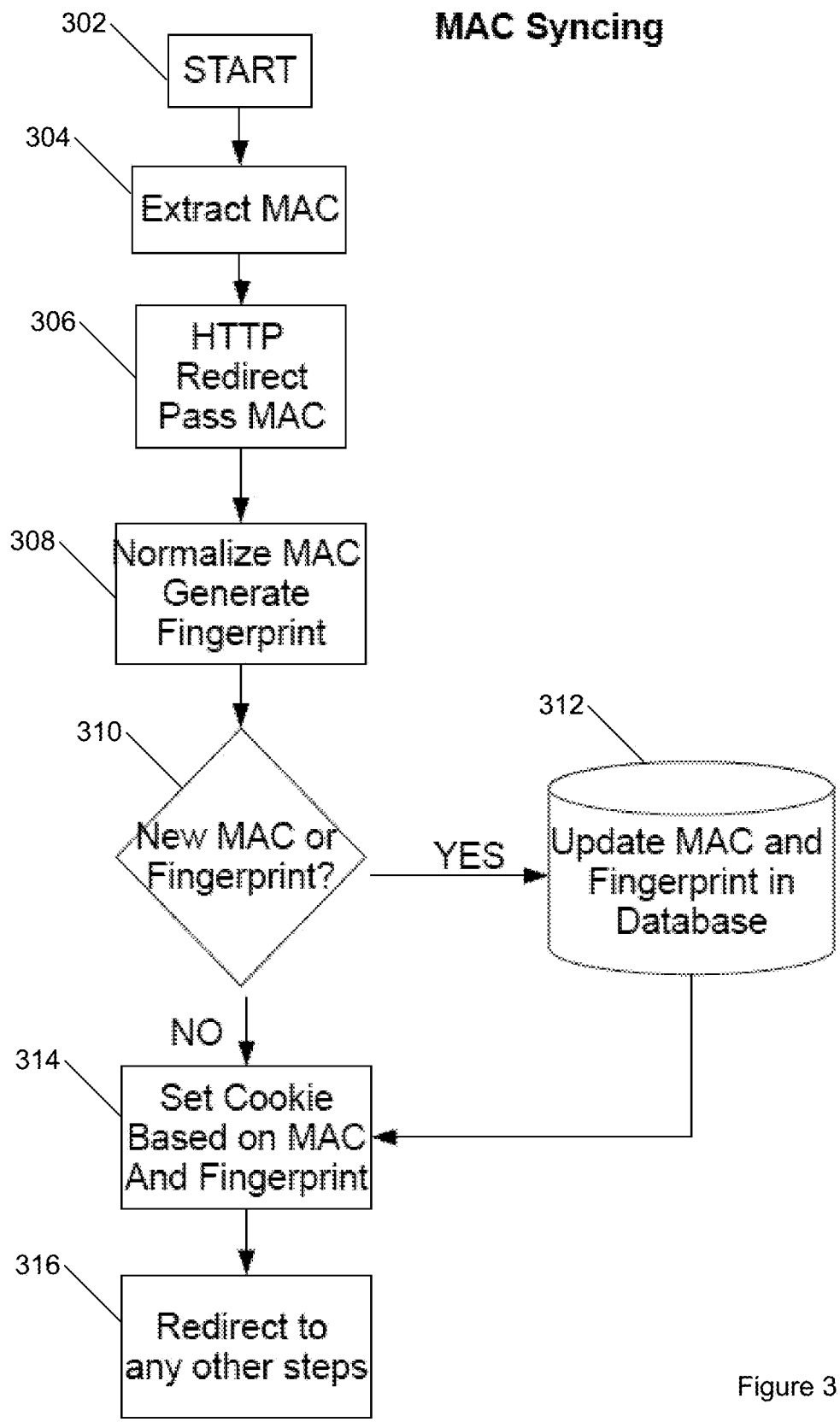
FIG. 3 illustrates an example of MAC syncing performed by the modules of the mobile advertisement targeting system in accordance with the systems and methods described herein.

FIG. 3 illustrates an example of MAC syncing performed by the modules of the mobile advertisement targeting system in accordance with the systems and methods described herein. This is the process by which a MAC address may be associated with a web identifier in an http request. The identifier can take on the form of an http cookie, a flash cookie, a super cookie (HTML5 web storage), any device specific attributes obtained via device fingerprinting techniques, or some combination of these or other device fingerprinting techniques.

The MAC Sync process can start at step 302. In step 304, the MAC can be extracted from a mobile computing device. This may be one of the generally two MAC addresses assigned to a mobile telephone handset or other mobile electronic device such as a smart phone. One MAC can be for its cellular network and one can be for WiFi. In some embodiments the WiFi MAC address might be used.

In step 306, an HTTP redirect can pass the MAC. For example, an HTTP 301 redirect or a third party tracking pixel request might be used. Some embodiments may use of a WiFi captive portal to pass the client MAC address obtained at a WiFi Access Point to a web server which then accomplishes a MAC Sync. A mobile application software development kit (SDK) might also be used to open in-application hyperlinks within the primary web browser of the mobile OS such that the client WiFi interface MAC address is passed along as a query parameter to a web server, which accomplishes establishes a MAC Sync and then issues a HTTP redirect to the intended destination.

In step 308, the MAC can be normalized and a fingerprint may be generated. Examples of device fingerprinting techniques can include the use of HTTP or Flash Cookies and other cookie-like stores to identify a device. For example a highly persistent cookie such as an "evercookie" or the like might be used. HTTP request headers, operating system details, browser details, browser settings, screen resolution, color bit depth, browser plugins and extensions, fonts, IP address, and temporal and contextual proximity might also be used for device fingerprinting. It will be understood that one or more of these identifying features as well as possible other identifying features may be used to identify a device and provide a device fingerprint.

In step 310, if the MAC or fingerprint are new then the MAC and fingerprint database can be updated in step 312. Otherwise a cookie may be set based on the MAC and the fingerprint in step 314. A redirect can occur at step 316.

In various embodiments a MAC Sync may occur when a user logs into both a publisher's website and native mobile application. The MAC address can be logged when the user signs into the native mobile application and then a MAC Sync may be conducted the next time the user signs into the publisher website. Such a system can use a database that maintains a mapping between a user's behavioral targeting data and its web identifier and its (optionally hashed) MAC address. The use of such a database may provide for targeted advertising in both web and native in-application advertising systems.

Some embodiments may use of a slow hash algorithm together with a salt to make the MAC address more anonymous. The use of just a subset of the octets in the MAC address may make the identifier more anonymous in that a probabilistic unique identifier of the user results.

In an embodiment an RTB system may be used that passes the user's MAC address to a bidding server that has a database of targeting information keyed by the MAC address.

Figure 4:
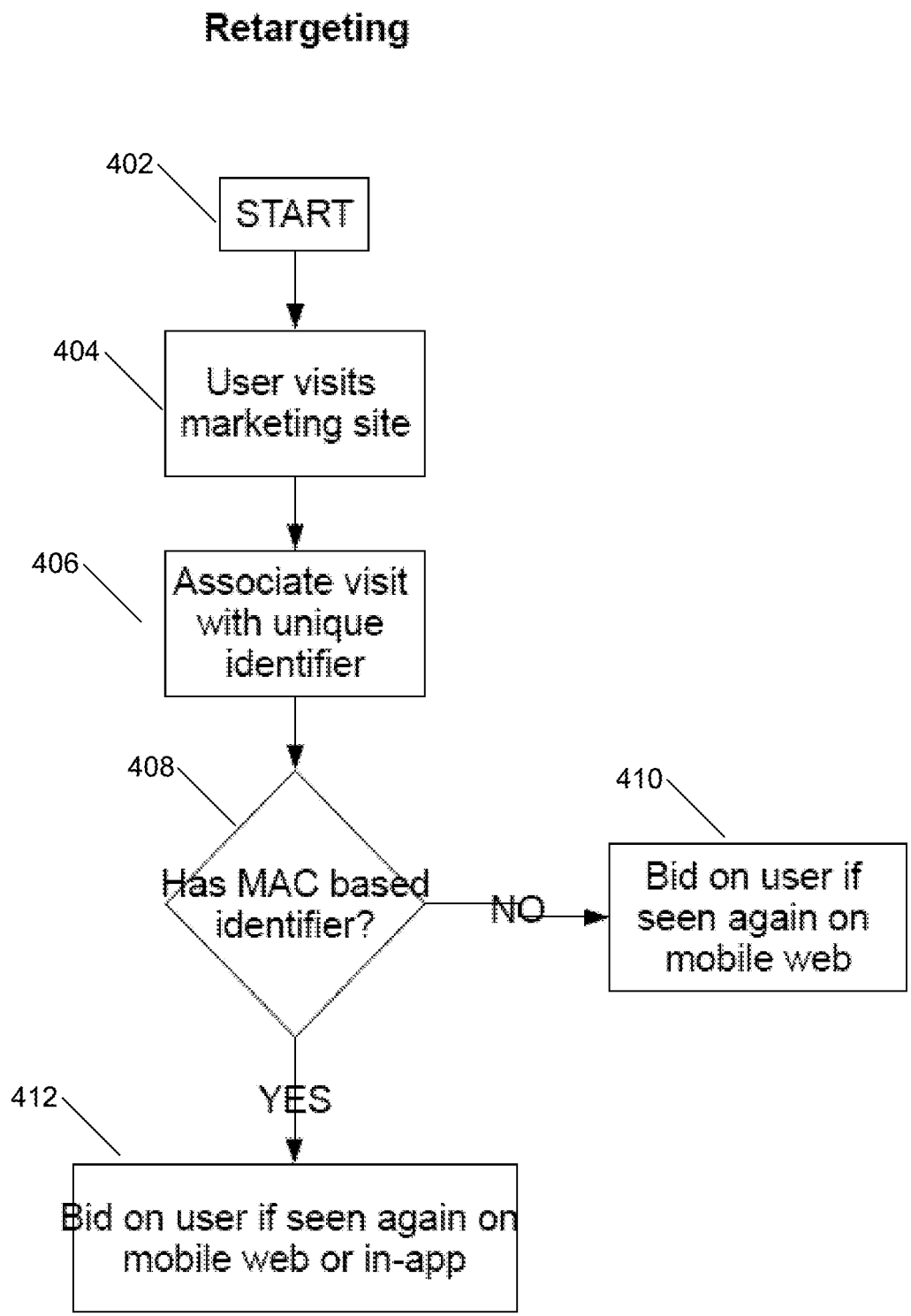
FIG. 4 illustrates an example of retargeting performed by the modules of the mobile advertisement targeting system in accordance with the systems and methods described herein.

FIG. 4 illustrates an example of retargeting performed by the modules of the mobile advertisement targeting system in accordance with the systems and methods described herein. The example method starts at step 402. In step 404, a user visits a marketing site. This visit may be associated with a unique identifier in step 406. If the user or the user's device has a MAC based identifier in step 408 then advertisers can bid on the user if the user (or the user's device) is seen again on a mobile web or in-application. If the user/device does not have a MAC identifier then, in step 410, advertisers can bid on the user/device being seen again on the mobile web.

Figure 5:
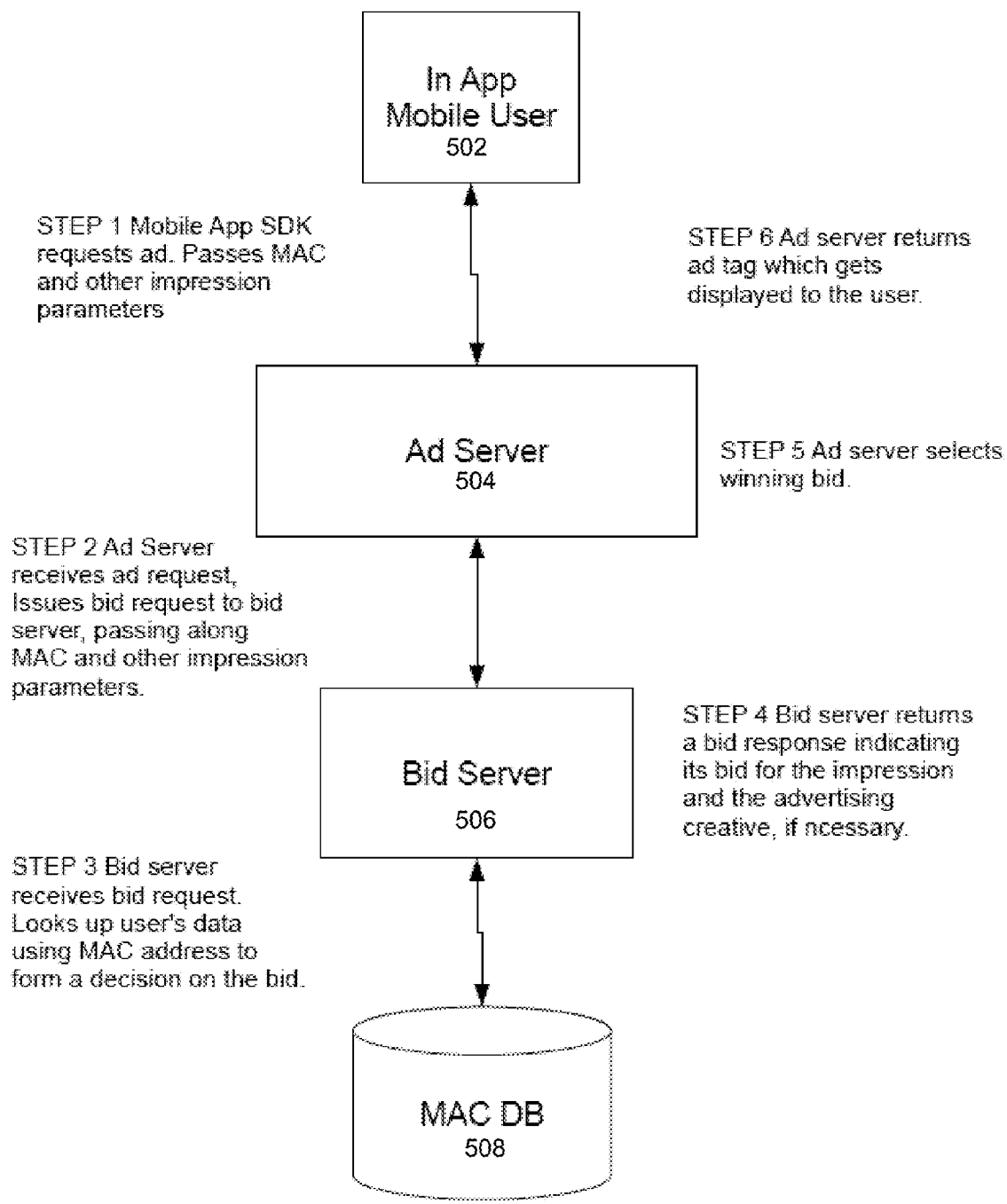
FIG. 5 illustrates an example of application advertisement targeting performed by the modules of the mobile advertisement targeting system in accordance with the systems and methods described herein.

FIG. 5 illustrates an example of application advertisement targeting performed by the modules of the mobile advertisement targeting system in accordance with the systems and methods described herein. In the example, application advertisement targeting with an in-application mobile program is illustrated at 502. In the illustrated embodiment, the in-application mobile program 502 has code to connect to an advertisement server 504. The advertisement server is in turn connected to a bid server 506 which connects to a MAC database 508.

In a first step, a mobile application SDK that can be within the in-application mobile application 502 may request an advertisement from an advertisement server 504. The advertisement server 504 may then receive the advertisement request and issue a bid request to bid server 506, passing along the MAC and other impression parameters in a second step.

In a third step the bid server 506 receives the bid request, looks up the user's (or mobile device's) data in the MAC database 508 using the MAC address to form a decision on the bid. The bid server 506 returns a bid response indicating a bid for the impression and the advertising creative, if necessary in the forth step. In a fifth step, the advertisement server 504 selects a winning bid and the advertisement server 504 returns an ad tag which gets displayed to the user in a sixth step.

Various embodiments of the systems and methods described herein provide for targeting against mobile web surfing behavior inside of a native application environment, targeting against mobile native application behavior on the mobile web, targeting against past real world location without GPS, or some combination of these. These systems and methods may also provide application download and install tracking from mobile web advertisements as well as providing systems that may be able to store a device-specific ID within a cookie exposing the MAC address to the internet layer for advertisement retargeting purposes. These systems and methods provide targeting options where such options are currently lacking in the mobile advertisement market due to crippling of third party cookies in the leading mobile web browsers.

One embodiment provides a mobile advertisement targeting system that utilizes MAC address data in combination with cookies. In addition, such an embodiment may provide for the collection of MAC address data in a way that can protect user privacy, such as by collecting a subset of the octets in a MAC address. In an example system a WiFi gateway may be used to 1) capture and then 2) pair with a HTTP cookie is in combination unique as far as we can tell.

An embodiment can use of a MAC Sync to bid and/or serve targeted advertising on the mobile web and native application based on a common ID space obtained from the MAC address. The collection of behavioral and demographics advertisement targeting information may be keyed by the user's web identifier as obtained from their MAC address. MAC Syncing may be used to enable targeting from mobile web to in-application and vice versa. Additionally, in some systems a business model around paying publishers for MAC addresses collected and/or used via one of the above mentioned device-to-web bridges.

In an embodiment, the software used to facilitate the functions and processes described herein can be embodied onto a computing-machine readable medium. A computer-readable medium includes any mechanism that provides (e.g., stores) information in a form readable by a machine (e.g., a computer). For example, a computing-machine readable medium includes read only memory (ROM); random access memory (RAM); magnetic disk storage media; optical storage media; flash memory devices; DVD's, EPROMs, EEPROMs, FLASH, magnetic or optical cards, or any type of media suitable for storing electronic instructions. As discussed, the programs and routines discussed herein may be implemented with software executed by a processor, hardware logic, and any combination of both.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These routines, algorithms, etc. may be written in a number of different programming languages such as JavaScript, C, C+, or other similar languages. Also, an algorithm may be implemented with lines of code in software, configured hardware logic gates, or a combination of both. In an embodiment, the logic consists of electronic circuits that follow the rules of Boolean Logic, software that contain patterns of instructions, or any combination of both. The module is generally scripted in a compatible programming language as the client-side web browser application resident on a client device.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

While some specific embodiments of the invention have been shown the invention is not to be limited to these embodiments. For example, most functions performed by electronic hardware components may be duplicated by software emulation. Thus, a software program written to accomplish those same functions may emulate the functionality of the hardware components in input-output circuitry. The invention is to be understood as not limited by the specific embodiments described herein, but only by scope of the appended claims.

I claim:

1. An apparatus, comprising:
a processor;
one or more non-transitory computer-readable media storing processor-executable code;
a first module configured to automatically collect media access control (MAC) address data and secondary identifier information associated with each of a plurality of mobile computing devices attempting to use a device-to-web bridge, wherein the secondary identifier information is obtained using a web browser cookie installed on the respective mobile computing device;
a second module in communication with the first module and configured to transmit the respective MAC address data and secondary identifier information for each of the plurality of mobile computing devices to a mobile advertisement targeting system configured to utilize the MAC address data and the secondary identifier for each mobile computing device to track each respective mobile computing device;
wherein the first module is further configured to automatically gather intent and demographic data after a respective mobile computing device has connected to a device-to-web bridge, using one or more of: the device-to-web bridge, a native mobile application operating on the respective mobile computing device, and a web content publisher application operating on the respective mobile computing device, wherein the intent data includes habit data of a user of the respective mobile computing device, and the demographic data includes demographics of the user of the respective mobile computing device;

an application programming interface configured to establish communications with one or more mobile advertisement exchanges, where advertisement impressions that are targeted to the intent and demographic data collected regarding the user of the respective mobile device are sent to the mobile advertisement exchanges, which incorporate this information into their bidding systems; and wherein the plurality of MAC addresses and secondary identifiers are stored within a database by storing a subset of octets making up a given MAC address, and hashing the subset of octets using a slow hashing algorithm combined with a salt to add a secret numeric sequence to the MAC address.

2. An apparatus, comprising:
a processor;
one or more non-transitory computer-readable media storing processor-executable code;
a first module configured to automatically collect media access control (MAC) address data and secondary identifier information associated with each of a plurality of mobile computing devices attempting to use a device-to-web bridge, wherein the secondary identifier information is obtained using a web browser cookie installed on the respective mobile computing device;
a second module in communication with the first module and configured to transmit the respective MAC address data and secondary identifier information for each of the plurality of mobile computing devices to a mobile advertisement targeting system configured to utilize the MAC address data and the secondary identifier for each mobile computing device to track each respective mobile computing device;
wherein the first module is further configured to automatically gather intent and demographic data after a respective mobile computing device has connected to a device-to-web bridge, using one or more of: the device-to-web bridge, a native mobile application operating on the respective mobile computing device, and a web content publisher application operating on the respective mobile computing device, wherein the intent data includes habit data of a user of the respective mobile computing device, and the demographic data includes demographics of the user of the respective mobile computing device;
an application programming interface configured to establish communications with one or more mobile advertisement exchanges, where advertisement impressions that are targeted to the intent and demographic data collected regarding the user of the respective mobile device are sent to the mobile advertisement exchanges, which incorporate this information into their bidding systems; and
wherein the device-to-web bridge is a captive WiFi portal that the user of the mobile computing device must log into in order to access a WiFi network, and wherein the secondary identifier is a Hypertext Transfer Protocol (HTTP) mobile cookie, and the captive web portal collects the MAC address and HTTP mobile cookie on a terms and conditions page of the captive WiFi portal.

3. A method comprising:
automatically collecting, by a computer system, media access control (MAC) address data and secondary identifier information associated with each of a plurality of mobile computing devices attempting to use a device-to-web bridge, wherein the secondary identifier information is obtained using a web browser cookie installed on the respective mobile computing device;
transmitting the respective MAC address data and secondary identifier information for each of the plurality of mobile computing devices to a mobile advertisement targeting system configured to utilize the MAC address data and the secondary identifier for each mobile computing device to track each respective mobile computing device;
automatically gathering intent and demographic data using one or more of: one or more device-to-web bridges, one or more native mobile applications on a mobile computing device, and one or more web publishers of content on a mobile computing device, wherein the intent data includes habit data of a user of a respective mobile computing device, and the demographic data includes demographics of the user of the respective mobile computing device;
establishing communications, by the computer system via an application programming interface, with one or more mobile advertisement exchanges, where advertisement impressions that are targeted to the intent and demographic data collected regarding the user of the mobile device are sent to the mobile advertisement exchanges, which incorporate this information into their bidding systems;
storing the plurality of MAC addresses and secondary identifiers within a database by storing a subset of octets making up a given MAC address; and
hashing the subset of octets using a slow hashing algorithm combined with a salt to add a secret numeric sequence to the MAC address.

4. A method comprising:
automatically collecting, by a computer system, media access control (MAC) address data and secondary identifier information associated with each of a plurality of mobile computing devices attempting to use a device-to-web bridge, wherein the secondary identifier information is obtained using a web browser cookie installed on the respective mobile computing device;
transmitting the respective MAC address data and secondary identifier information for each of the plurality of mobile computing devices to a mobile advertisement targeting system configured to utilize the MAC address data and the secondary identifier for each mobile computing device to track each respective mobile computing device;
automatically gathering intent and demographic data using one or more of: one or more device-to-web bridges, one or more native mobile applications on a mobile computing device, and one or more web publishers of content on a mobile computing device, wherein the intent data includes habit data of a user of a respective mobile computing device, and the demographic data includes demographics of the user of the respective mobile computing device;
establishing communications, by the computer system via an application programming interface, with one or more mobile advertisement exchanges, where advertisement impressions that are targeted to the intent and demographic data collected regarding the user of the mobile device are sent to the mobile advertisement exchanges, which incorporate this information into their bidding systems; and wherein the device-to-web bridge is a captive WiFi portal that the user of the mobile computing device must log into in order to access a WiFi network, and wherein the secondary identifier is a Hypertext Transfer Protocol (HTTP) mobile cookie, and the captive web portal collects the MAC address and HTTP mobile cookie on a terms and conditions page of the captive WiFi portal.

* * * * *